(12) United States Patent
Bilek et al.

(10) Patent No.: US 7,600,492 B2
(45) Date of Patent: *Oct. 13, 2009

(54) MOTOR ENGINE FAMILY

(75) Inventors: Andreas Bilek, Buchkirchen (AT); Gerd Ohrnberger, Rutzenmoos (AT); Norbert Korenjak, Stadl-Paura (AT)

(73) Assignee: BRP-Powertrain GmbH & Co KG, Gunskirchen (AT)

( * ) Notice: Subject to any disclaimer, the term of this patent is extended or adjusted under 35 U.S.C. 154(b) by 662 days.

This patent is subject to a terminal disclaimer.

(21) Appl. No.: 11/168,504

(22) Filed: Jun. 29, 2005

(65) Prior Publication Data

US 2008/0127915 A1 Jun. 5, 2008

Related U.S. Application Data

(63) Continuation of application No. 09/961,338, filed on Sep. 25, 2001, now Pat. No. 7,000,577.

(51) Int. Cl.
*F02B 75/18* (2006.01)

(52) U.S. Cl. .................................................. 123/52.1

(58) Field of Classification Search ............ 123/DIG. 8, 123/54.1, 54.2, 54.4–54.8, 55.1–55.2, 58.1; 29/888.01
See application file for complete search history.

(56) References Cited

U.S. PATENT DOCUMENTS

| | | | |
|---|---|---|---|
| 4,198,947 A | | 4/1980 | Rassey |
| 4,330,994 A | * | 5/1982 | Rosenqvist ................. 60/525 |
| 4,337,623 A | * | 7/1982 | Kronogard ................. 60/716 |
| 4,399,777 A | * | 8/1983 | Hoettels ................... 123/54.4 |
| 6,257,178 B1 | | 7/2001 | Laimböck |
| 6,390,869 B2 | | 5/2002 | Korenjack et al. |
| 7,000,577 B2 | | 2/2006 | Bilek et al. |

FOREIGN PATENT DOCUMENTS

| | | |
|---|---|---|
| DE | 2904387 A1 | 8/1980 |
| DE | 19846586 A1 | 4/2000 |
| FR | 831895 | 3/1948 |
| GB | 2344378 A | 6/2000 |

OTHER PUBLICATIONS

"Novel Diesel Engines to be Built in Modules", Machine Design, vol. 61, No. 16, Aug. 10, 1989.
AVL Spectros-EIN Motorenkonzept Fuer Leichtbau und Modulbauweise, vol. 61, No. 2, Feb. 2000.

* cited by examiner

*Primary Examiner*—Hai H Huynh
(74) *Attorney, Agent, or Firm*—Osler, Hoskin & Harcourt LLP (57) ABSTRACT

A modular family of internal combustion engines is described. The family includes at least two engine configurations selected from a single cylinder, V-type, inline, opposed, W-type, and radial configurations. Each of the engines in the family includes at least one cylinder with identical top end packages. A method for designing such a family of engines is also disclosed.

15 Claims, 12 Drawing Sheets

MOTOR ENGINE FAMILY

This application is a continuation of application Ser. No. 09/961,338, entitled "Modular Engine Family", filed on Sep. 25, 2001, which relies for priority on U.S. Provisional Patent Application Ser. No. 60/234,966, entitled "Modular Engine Family," both applications incorporated herein by reference.

This application also incorporates herein by reference U.S. Provisional Patent Application Ser. No. 60/185,703, entitled "Flex Engine 1503," filed on Feb. 29, 2000; U.S. Provisional Patent Application Ser. No. 60/229,338 entitled "Flex Engine 610," filed Sep. 1, 2000; U.S. Non-Provisional patent application Ser. No. 09/794,219, entitled "Four Stroke Engine with Cooling System," filed on Feb. 28, 2001; U.S. Non-Provisional patent application Ser. No. 09/794,240, entitled "Four Stroke Engine with Valve Train Arrangement," filed on Feb. 28, 2001; U.S. Non-Provisional patent application Ser. No. 09/794,237, entitled "Four Stroke Engine With Intake Manifold," filed on Feb. 28, 2001; U.S. Non-Provisional patent application Ser. No. 09/794,218, entitled "Four Stroke Engine Having a Supercharger," filed on Feb. 28, 2001; U.S. Non-Provisional patent application Ser. No. 09/794,215, entitled "Four Stroke Engine Having Blow-By Ventilation System and Lubrication System," filed on Feb. 28, 2001; U.S. Non-Provisional patent application Ser. No. 09/794,238, entitled "Four Stroke Engine Having Power Take Off Assembly," filed on Feb. 28, 2001; U.S. Non-Provisional patent application Ser. No. 09/794,245, entitled "Four Stroke Engine Having Flexible Arrangement," filed on Feb. 28, 2001; U.S. Non-Provisional patent application Ser. No. 09/794,239, entitled "Control Tensioner Device For An Engine," filed on Feb. 28, 2001; U.S. Provisional Patent Application Ser. No. 60/316,207, entitled "Component Arrangement For An All Terrain Vehicle," filed on Aug. 31, 2001; U.S. Provisional Patent Application Ser. No. 60/316,029, entitled "Blow-By Gas Separator For An Internal Combustion Engine," filed on Aug. 31, 2001; U.S. Provisional Patent Application Ser. No. 60/316,030, entitled "Continuously Variable Transmission For an Internal Combustion Engine," filed on Aug. 31, 2001; U.S. Non-Provisional Ser. No. 09/944,144, entitled "Blow-By Gas Separator and Decompressor For An Internal Combustion Engine," filed on Sep. 4, 2001; U.S. Non-Provisional patent application Ser. No. 09/944,159, entitled "Continuously Variable Transmission For an Internal Combustion Engine," filed on Sep. 4, 2001; and U.S. Non-Provisional patent application Ser. No. 09/943,737, entitled "Component Arrangement For An All Terrain Vehicle," filed on Sep. 4, 2001; all of which are assigned to the same assignee as the present application.

BACKGROUND OF THE INVENTION

1. Field of the Invention

The present invention relates to a modular engine design for a family of internal combustion engines and particularly, to a family of four-stroke engines.

2. Description of the Related Art

In developing a new engine, significant resources go into designing a basic cylinder package. In an overhead valve ("OHV") four-stroke engine, the basic cylinder package includes the cylinder itself, the cylinder head, valve train, piston, connecting rod and related components. These components must be designed to provide the desired engine displacement, performance, durability, size and weight at an acceptable manufacturing cost. Therefore, in a multiple cylinder engine, some or all of these components are designed for one cylinder and are then utilized in the other cylinders in the multiple cylinder engine. For instance, it is common in an automotive engine for the pistons, connecting rods, intake valve mechanisms and exhaust valve mechanisms to be identical from cylinder to cylinder within the 4, 5, 6 and 8 cylinders of that engine.

However, such a common parts package is not known in the automotive field to have been adopted by manufacturers in a family of engines of different basic configurations. For instance, in the automotive field it is not known to use the common parts package in both a V-8 engine and an inline four or six cylinder engine. When a manufacturer offers, for example, both a V-8 engine and an inline (or straight) six, each of these engines is typically independently developed from the ground up, with little parts interchangeability. This increases not only the designing cost but also the cost of manufacturing, storing and distributing this greater number of unlike components.

The use of common cylinder package components in different engine configurations has been previously accomplished in the motorcycle field. In the 1950's, the Vincent motorcycle company manufactured the Rapide, a 1000 cc OHV V-twin, and the Meteor, a 500 cc OHV single. The Meteor used the same cylinder, piston, piston rings, piston pin and connecting rod as used in both cylinders of the Rapide. The Meteor also used the same cylinder head as was used on the front cylinder of the Rapide, although the rear cylinder head on the Rapide differed from the front cylinder head. The valve trains were the same on the single cylinder of the Meteor and both cylinders of the Rapide, but for the camshafts. The Meteor camshaft was the same as the rear camshaft of the Rapide, while the rear camshaft of the Rapide differed from the front camshaft of the Rapide. Thus, even though there was some commonality of top end components between the single and the V-twin, overall commonality was not achieved on all cylinders of these engines as evidenced, for example, by the different cylinder heads installed on the front and rear cylinders of the V-twin. Further, there was no use of the common cylinder package on any other configuration of engine. Rather, the V-twin was basically the single configuration with an added cylinder.

Further, even when there has been commonality of components within different engines, those engines were all intended for similar use applications. For instance, even though the Vincent Rapide and Meteor motorcycles used common components in their respective engines, both engines were intended specifically for use in motorcycles and were subjected to the same or very similar operating environments. Likewise, even where an automobile manufacturer has used common components in various engines, such engines have been intended for the same application, i.e., powering an automobile or truck. Consideration has not been given to designing common components for a plurality of engines intended for quite diverse applications, such as for use in watercraft, boats (both inboard and outboard applications), snowmobiles, ATVs and motorcycles, all of which place different demands on their respective engines.

SUMMARY OF THE INVENTION

The present invention is directed to a family of engines and a method for designing the family of engines where each of the cylinders of each of the engines utilizes the same top end component package. In one alternative, each of the engines of the family are overhead valve, four-stroke engines. The top end component package includes 1) at least one exhaust valve, valve seat, valve guide, valve stem seal, valve spring, valve spring retainer and exhaust valve rocker arm; 2) at least one intake valve, valve seat, valve guide, valve stem seal, valve spring, valve spring retainer and intake valve rocker arm. In a more complete approach, the top end component package can include one or more of the following: a piston, a connecting rod, a piston pin, a small end rod bearing, a big end rod bearing, a set of piston rings, a pair of connecting rod bolts, a cam chain tensioner, an exhaust valve hydraulic tappet for each exhaust valve, an intake valve hydraulic tappet for each intake valve, a cylinder head and one or more camshafts (e.g., single overhead cam, "SOHC," or dual overhead cam, "DOHC"). In still another approach, the top end component package can include at least one rocker arm shaft.

In this way, a single basic top end component package can be designed once and then utilized for every cylinder of each engine in the family. Therefore, additional resources need not be expended in designing new top end component packages specifically for each engine in the family. In the most complete approach, the top end component package can include everything from the base gasket up. Each cylinder/head unit of each engine is identical. Alternatively, the top end component package can be designed around the entire cylinder/head unit but only actually include certain of the moving components identified above. In this way, a multiple cylinder engine, such as an inline three, is designed with each of the cylinders based on the entire common cylinder/head unit. Therefore, the bore, stroke and most other dimensions are the same, as well as several of the moving components identified above. However, the engine need not be required to use three individual cylinders, cylinder heads and camshafts. Rather, a single cylinder block having three cylinders can be utilized, along with, if desired, a single cylinder head having the three combustion chambers and related valve trains and a single camshaft having three sets of lobes for the three cylinders. Thus, in such an embodiment, the benefits of a single top end component package design can be obtained without being limited to the use of individual cylinder/cylinder head units where such is not desired.

In a basic embodiment of the invention, the family of engines includes a single cylinder engine and a V-twin, with the V-twin preferably using two of the single cylinder engines complete cylinder/cylinder head units from the base gasket up. In a further development of such an embodiment, the family of engines includes an inline three. However, the inline three can include three separate complete cylinder/cylinder head units from the base gasket up or can use the single cylinder, cylinder head and camshaft approach discussed above. The engine family can include further configurations, such as opposed (flat or boxer style), square (having two interconnected crankshafts), w-type, radial and other known configurations. More specifically, the engine family can include a V-four, V-six, V-eight, inline twin, inline four, opposed two and four, square four, and other configurations having from 2-16 cylinders. Although use of more than 16 cylinders is contemplated, it is not expected. If a 500 cc single cylinder design is utilized, the V-twin will displace 1000 cc and the inline three will displace 1500 cc. If a 650 cc single cylinder design is utilized, the V-twin will displace 1300 cc and the inline three will displace 1950 cc.

In a further aspect of the invention, each of the common components between the engines of the family is designed to the standard of the strictest requirement of any of the engines. That is, where one engine application has specific performance requirements for certain of the expected common components that are stricter than in other engine applications, the common component is designed to the strictest standard. For example, an engine for use in a marine environment can have specific requirements for component materials and coatings to prevent corrosion. Thus, since the marine application may require that a certain component be made of a certain material and/or have a certain coating to combat corrosion, all of these certain components for use across the entire engine family are made to this standard, even though such corrosion resistance may not be required in other applications of the engine family. While this can increase certain aspects of the manufacturing cost of these components, it is expected that overall, there will be a cost savings by utilizing such an approach.

As another example, the family of engines can include both normally aspirated and supercharged models and/or engines intended for operation within lower or higher RPM limits. Thus, the common components are designed to the stricter requirements of the supercharged engine and/or the higher RPM limit. Additionally, certain of the common components, such as connecting rods, pistons and bearings are designed to have the increased strength required in such applications. Further, since the higher RPM limit engine must be able to flow increased quantities of air at the higher RPMs, the intake and exhaust systems are designed for this higher breathing requirement, even though other engines in the family operating at lower RPMs will not need such breathing capability.

The added cost for such commonality at a higher level of performance is offset by several things. First, since the basic design for the cylinder package is the same across the entire family, initial design costs are reduced since a different cylinder package design is not required for each engine. This savings can be significant at the early design stage and can also significantly reduce the time required between start of the design and being able to bring the final product onto the market. Second, by using the same component across the entire family of engines, the quantity of this component needed increases, as opposed to using different designs of this component in different applications. Thus, this increased number required of the same component can result in manufacturing efficiencies and provide volume discounts. Also, the smaller number of distinct parts will decrease the extent and cost of the tooling required for manufacturing the common components as compared to a larger number of distinct parts.

Further, stocking and distribution costs can be decreased since only the one component need be supplied to satisfy the need across the entire engine family, as opposed to having to inventory and supply multiple different embodiments of this same component. This can be especially beneficial when later supplying spare parts (spares) for the engines. A smaller number of unique part numbers will provide the necessary spares support required by the entire engine family. Also, with such commonality of components, the consumer is provided additional sources of spares for his or her application since the spares can be obtained from any dealer supplying spares for any of the engine applications, even if the dealer is operating in a different application than the consumer's. For instance, where one or more of the family of engines is used in both snowmobiles and personal watercraft, a snowmobile consumer can obtain the common component from a personal watercraft dealer, even though that dealer may not deal in snowmobiles. Thus, even though there can be an increased expense element associated with manufacturing all common components to the highest required standard, the associated cost savings from decreased design time, increased manufacturing quantities and decreased inventory and supply costs can offset this expense element and result in a net overall savings to the company.

These savings are particularly beneficial in the design, development, manufacture, sale, and service of recreational products such as snowmobiles, all terrain vehicles, go carts, personal watercraft, boats with outboard motors, boats with inboard engines, motorcycles, scooters, and light aircraft, to list the most common members of the recreational vehicle family. The reason for this is as follows. Recreational products have a production volume that is generally less than the production volume for automobiles. Since automobiles are produced in high numbers, the costs associated with production and service of the vehicles and the storage of replacement parts are less pronounced. For a variety of types of recreational vehicles, however, where the production volume is smaller, the cost benefits are more readily appreciated.

Still further aspects of the present invention will be made apparent from the description that follows.

BRIEF DESCRIPTION OF THE DRAWINGS

The figures appended hereto illustrate various aspects of the present invention. Where appropriate, like reference numbers refer to like structures in the drawings, in which.

DETAILED DESCRIPTION OF PREFERRED EMBODIMENTS

Figure 1:
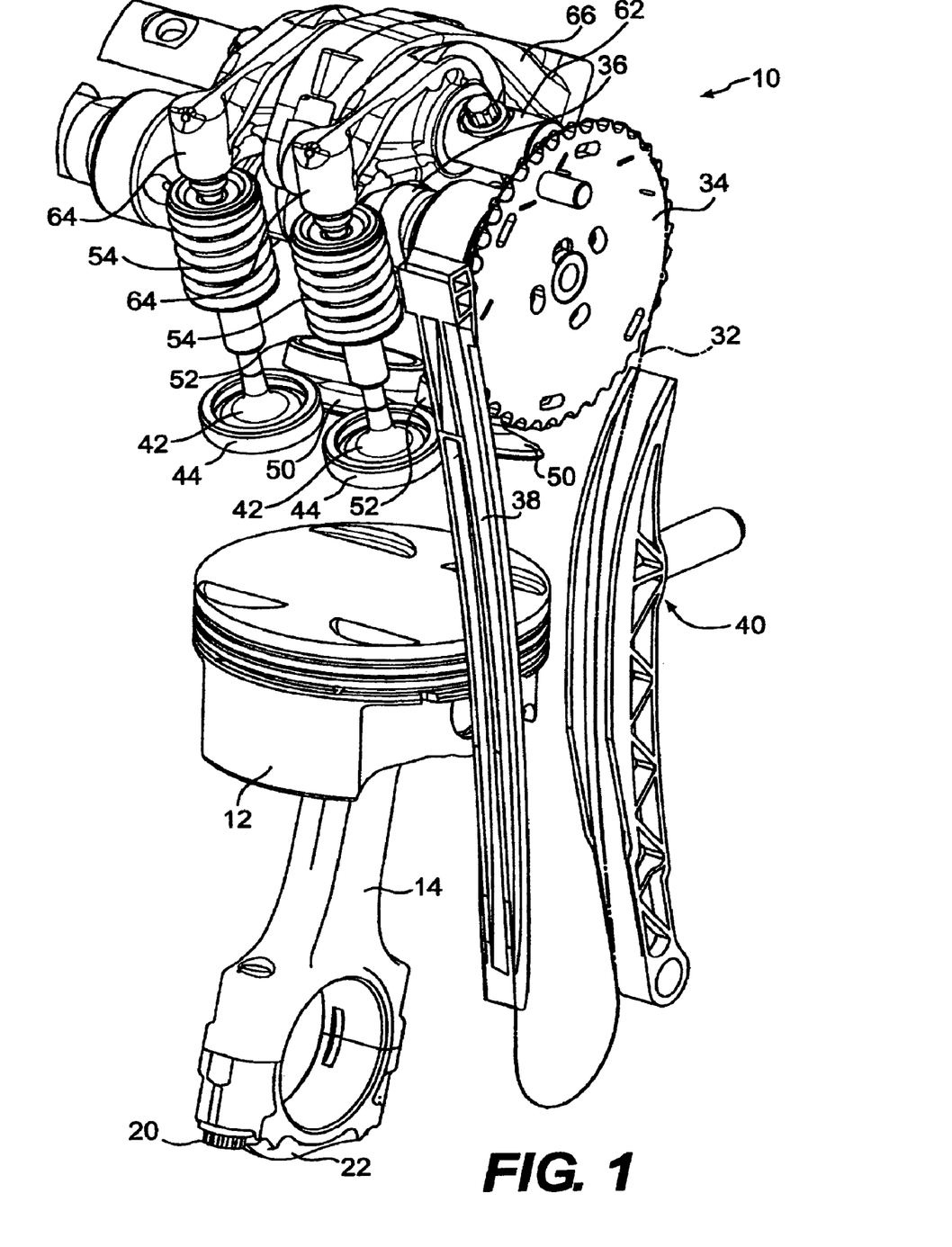
FIG. 1 is a partial phantom perspective view of a cylinder component package of the present invention.

A top end package for a single cylinder is shown generally schematically at 10 in FIG. 1. Piston 12 is connected to connecting rod 14 by piston pin (not shown) with an upper end bearing (not shown) therebetween. The piston pin is maintained in piston 12 by a pair of retainers (not shown). A pair of bolts 20 attach connecting rod cap 22 to the connecting rod 14. The connecting rod 14 mounts to a rod journal (not shown) of a crankshaft (not shown) with a lower end bearing (not shown) mounted therebetween. A set of piston rings (not shown) is installed on piston 12.

A lower cam drive gear (not shown) is mounted to the crankshaft (not shown) to drive cam chain 32 (illustrated as a dotted line for simplicity) which in turn drives upper cam drive gear 34 mounted to cam 36. A cam chain guide rail 38 maintains the positioning of the cam chain 32. A cam chain tensioner, shown generally at 40 adjusts the slack in the cam chain 32. A pair of intake valves 42 are mounted in intake valve guides 44 installed in a cylinder head 46 (see FIG. 3) and seal against intake valve seats on the interior surface of the valve guides 44, respectively. Similarly, exhaust valves 50 are mounted in exhaust valve guides 52 installed in the cylinder head and seal against exhaust valve seats on the interior surface of the exhaust valve guides 52. Each valve is maintained in a closed position by a spring assembly 54 incorporating at least one return spring, a spring retainer and a keeper. A rocker arm shaft 62 is mounted in the cylinder head above the cam 36. A pair of intake rocker arms 64 are pivotally mounted on the rocker arm shaft 62 to open the intake valves 42, respectively, by action of the cam 36. An exhaust rocker arm 66 is pivotally mounted on the rocker arm shaft 62. A single exhaust lobe on the cam 36 drives the exhaust rocker arm 66 that is split on the valve side to drive both exhaust valves 50. Hydraulic tappets are mounted between the rocker arms and the valves to adjust the clearance therebetween. Further details regarding these components can be found in the U.S. Provisional and Non-Provisional patent applications incorporated herein by reference.

The preferred embodiment of the present invention incorporates a single cam 36 to activate the intake valves 42 and the exhaust valves 50. This is often referred to as a single overhead cam (or "SOHC") design. While the SOHC design is preferred because it requires fewer components and, therefore, occupies a smaller volume, a dual overhead cam (or "DOHC") may also be used to practice the present invention. A DOHC design provides a separate cam for each of the intake and exhaust valves 42, 50.

The common top end package can include some or all of these components and can further include components such as the cylinder and cylinder head, assorted gaskets, seals, bearings, fasteners and covers, among other things. Thus, the complete cylinder design, including intake and exhaust port shapes, combustion chamber design and most of the other factors that go into the single cylinder design can be utilized in other cylinders of engines of the engine family.

The common top end package is also designed so that it will be capable of providing at least the minimum performance necessary to accommodate the most stringent requirements of any of the engines in the engine family. For instance, an engine of the engine family intended for use in a small watercraft may require a relatively flat torque curve matched to the torque curve required to drive the watercraft propeller or jet pump impeller. Further, the engine will not require exceedingly high RPM operation and may have a rev limit of about 7500 RPM. Therefore, the basic engine design must be capable of such operation. On the other hand, an engine intended for a motorcycle will likely require higher RPM operation than the watercraft engine to address the needs of the motorcycle market. This higher RPM operation, for instance, to 10,000 RPM or higher, will require that the intake and exhaust systems have the ability to adequately flow at the higher RPM. It will also require that each of the moving engine components be able to withstand the higher velocities, accelerations and forces associated with the higher RPM. Thus, for instance, the rods and pistons must be designed to withstand the higher loading due to the higher RPM and the valve train must not float at such RPM.

For a family of engines that is intended to power a diverse line of recreational vehicles, such as personal watercraft, boats (including inboard and outboard engines), snowmobiles, ATVs and motorcycles, there are a number of most demanding requirements that are applied to the engine family as a result of the specific requirements imposed by each of the vehicles. For instance, since a snowmobile operates in cold weather conditions, it is important to design the engine so that it can start and run without damage at −40° C. This may include designing the engine to use a decompression device for starting to reduce the torque required from either a manual or electric starter to start the engine. Furthermore, the oil and cooling systems must be designed to operate at such low temperatures until the engine has warmed up. This application is also very sensitive to engine weight, especially as compared to two-stroke engines, so it is important to obtain high performance from the engine for the given engine weight. In this regard, the engine is able to be turbocharged to increase engine performance. Since the engine must turn at a relatively high RPM above idle before the CVT starts to engage, turbocharger boost starts before such CVT engagement and turbocharger lag is minimized or eliminated. On the other hand, this engine needs to deliver full power without resorting to high RPM, since such high RPM substantially increases the wear of the CVT belt.

A watercraft application, for example, a small boat or personal watercraft, has other requirements. Since the watercraft operates in a marine environment, the engine must be corrosion resistant, especially when operating in salt water. Here, performance is also important, but the engine torque curve must be tailored to match the torque curve requirement of the propeller or jet pump impeller. A turbocharged engine does not work well in such an application because the torque curve from such an engine does not match the torque curve requirement of the propeller or jet pump impeller. On the other hand, a supercharged engine, i.e., an engine with a positively driven supercharger, as opposed to an exhaust gas driven turbocharger, can provide higher performance and works well in such an application since the torque supplied curve closely matches the torque required curve. While such a supercharged engine may not produce the same peak power as a turbocharged engine, the performance increase is welcome and relatively inexpensive, especially when using a positively driven vane impeller supercharger. However, such a supercharger does not work particularly well in a land-based vehicle that has a positive drive connection with the ground. As with the snowmobile application, this engine needs to deliver full power without resorting to high RPM because the propeller or impeller loses efficiency at such high RPM.

Furthermore, the crankshaft for this application must be of a sufficient size and diameter so as to handle the requirements of the PTO, the generator and other accessories driven by the crankshaft in a typical watercraft installation. However, a large diameter crankshaft results in a large diameter timing chain drive gear. The large diameter crank gear means a larger driven cam gear (the cam gear is twice the size of the drive gear if no intermediate gear is used) and results in a larger head. However, it is desirable across the entire engine family to have a compact head design because this reduces the amount of space necessary to accommodate a given engine in a specific vehicle. In the present invention, the head has been designed to have a single camshaft 62 disposed between the narrow angle of the valves to reduce the overall size of the head.

An ATV, in many applications, does not require the high performance of the other vehicles mentioned. For instance, torque output can be lower, as well as peak RPM. However, the engine must start easily across a wide temperature range. Therefore, the engine should be able to easily adopt a decompression device for easing starting, especially on engines having only a manual starter.

A motorcycle has very different power output requirements than the vehicles above. In most applications, the engine must provide high performance and be able to operate at the highest RPM of any of the vehicles identified herein. However, the engine must be able to pull strongly from idle, since the motorcycle uses a gearbox and not a CVT. Therefore, the engine must be capable of high performance in a normally aspirated state since turbo lag is generally unacceptable.

Therefore, when designing the top end package for an engine family that will provide engines to such diverse vehicles, it is important to design the package to accommodate each of the strictest requirements discussed above. Thus, depending on the power requirements, the same basic package must be capable of being normally aspirated, turbocharged and/or supercharged, as well as being capable of both low and high RPM operation. It must be readily tuned to best match the output torque with the application and must be readily started and operable across a broad temperature range. It is important to keep the overall size of the package small so that each engine can be most easily accommodated within the available space of the vehicle.

Figure 2:
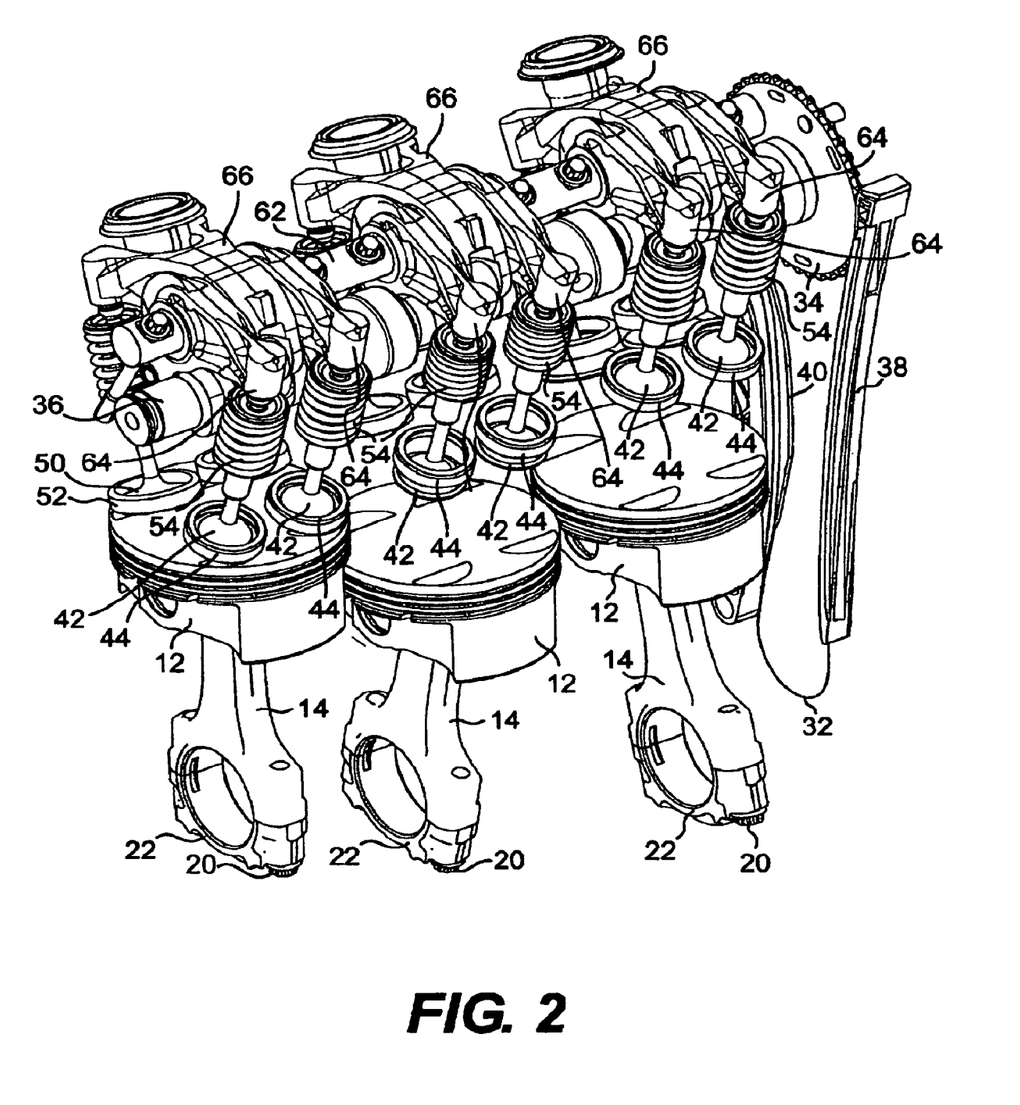
FIG. 2 is a partial phantom perspective view of an inline three cylinder engine using the cylinder component package of the present invention.
Figure 3:
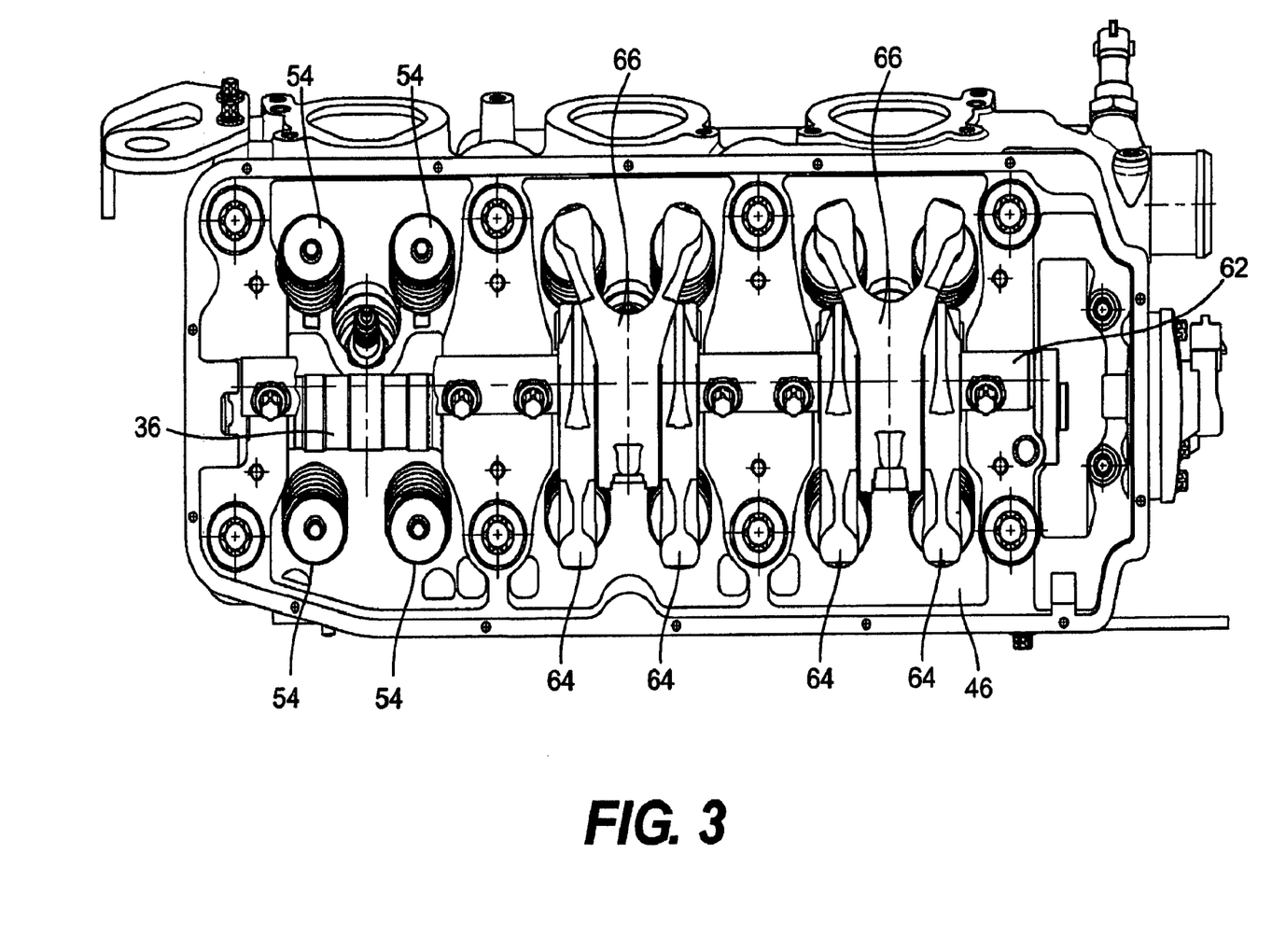
FIG. 3 is a partial phantom view of the engine of FIG. 2, also showing portions of the cylinder and cylinder head.

FIG. 2 shows how the identical components described above with respect to a single cylinder application are used with respect to each cylinder of a three cylinder inline engine of the family (with the exception of the cam, which is extended to handle all cylinders). FIG. 3 shows a downward perspective view of the components shown in FIG. 2. In this embodiment, it is contemplated that a single cylinder block and a single cylinder head be used, as opposed to three separate cylinders and heads. Alternatively, the separate cylinders and heads can be utilized. Although not shown here, the crankshaft is different from the crankshaft used in the single cylinder engine as it will have three rod journals (among other things) as opposed to one rod journal.

The same basic cylinder design can also be used to provide different cylinder capacities, and thus different engine capacities, merely by changing the stroke of the crankshaft. Generally, this will also involve changing the length of the connecting rod, as is known. Therefore, the same single cylinder design having a bore of 100 mm can provide a cylinder displacement of 498 cc when utilized in conjunction with a crankshaft having a stroke of 63.4 mm and a cylinder displacement of 644 cc when utilized in conjunction with a crankshaft having a stroke of 82 mm. Only the crankshaft, the connecting rod and the length of the timing chain need be changed to do so, the cylinder and other components can be the same in both instances. Other bores and strokes are also possible depending on the desired characteristics of the cylinder design.

Thus, the same basic cylinder design can be used with a common top end component package to create a family of engines especially adapted to different applications. For instance, a single cylinder engine of between 400-650 cc (generally) can be used in an ATV or motorcycle. A V-twin or inline twin of between 1000-1300 cc (generally) can be used in an ATV, motorcycle, snowmobile or personal watercraft. An inline three or four cylinder of between 1500-2600 cc (generally) can be used in a motorcycle, snowmobile, personal watercraft or small boat (both inboard and outboard applications). A V-six engine of between 3000-3900 cc (generally) can be used in a boat. Other sizes and configurations can be used in other applications, such as automobiles, industrial vehicles and aircraft, as the applications require. All of this is based on one cylinder design.

Figure 4:
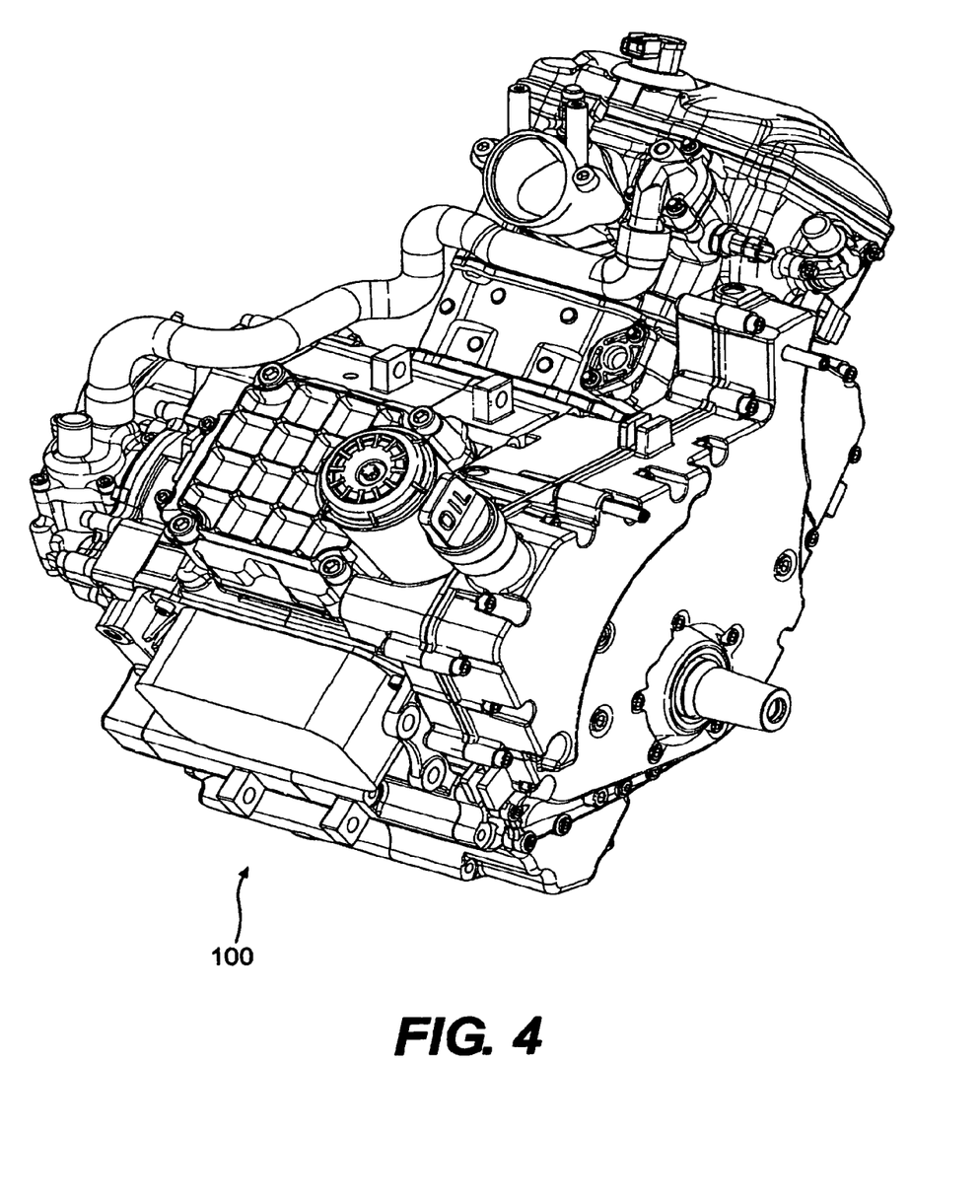
FIG. 4 is a perspective view of a first embodiment of a single cylinder engine using the cylinder component package of the present invention.

FIG. 4 shows a general schematic view of a single cylinder engine 100 according to the present invention. In the configuration shown, the engine is normally aspirated. However, in this and all of the other configurations, the engines can either be normally aspirated or supercharged and can use either one or more carburetors or some form of fuel injection.

Figure 5:
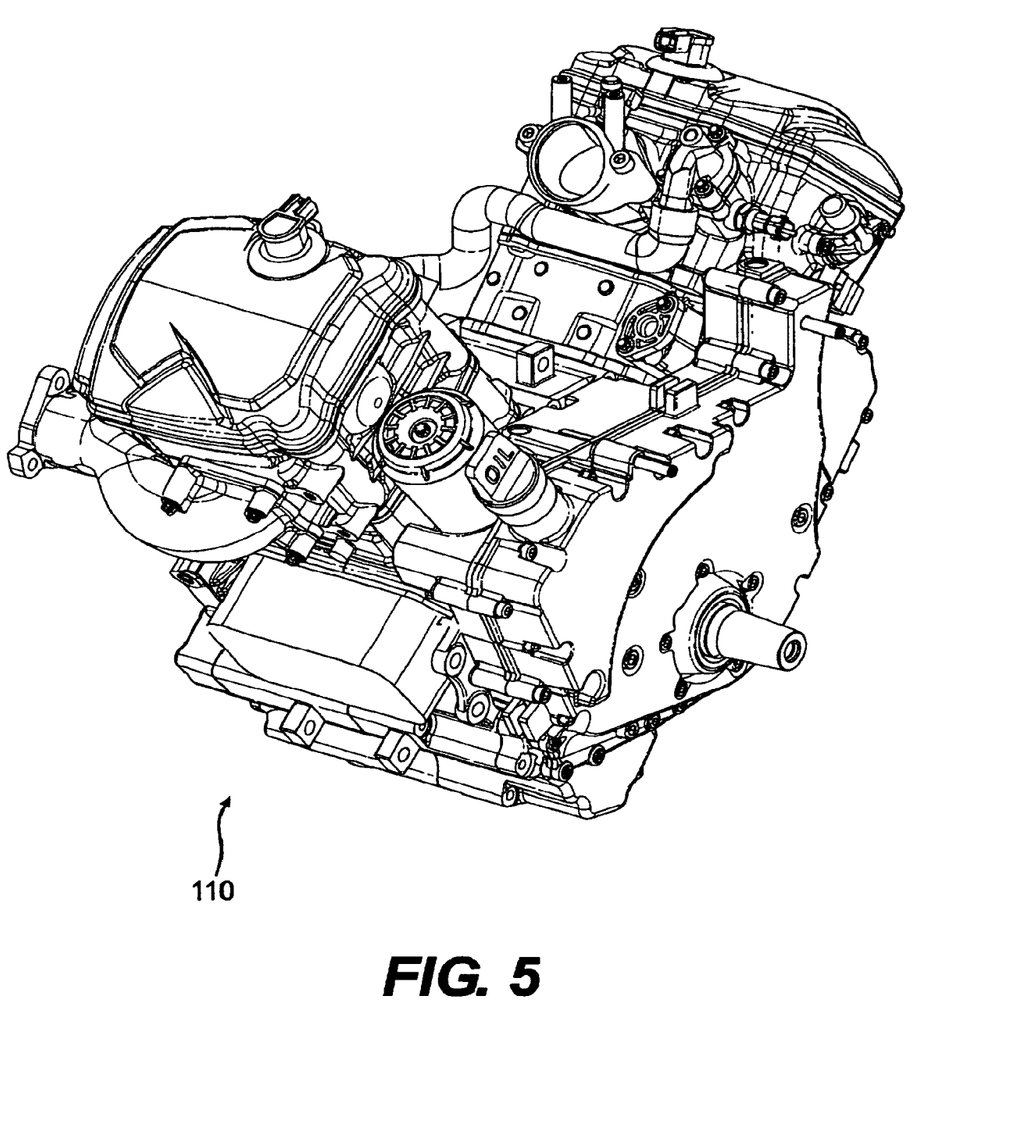
FIG. 5 is a perspective view of a V-twin engine using two of the cylinder component packages of the present invention.

FIG. 5 shows a general schematic view of a V-twin engine 110 according to the present invention. Here, the same top end package as used in the single cylinder engine 100 is used in both cylinders of the V-twin. The same cylinder and cylinder heads are used, although in this configuration, the rear cylinder and cylinder head have been rotated 180° so that intake ports of each cylinder can be positioned facing one another for convenience of intake plumbing. In such an embodiment, the rotation of the cylinder and cylinder head will require a rear cam having a reverse grind and may require reversal of the cam chain guide rail and cam chain tensioner. Alternatively, the V-twin can be designed with both cylinders having the same orientation, for instance, with both exhaust ports facing forward. The V-twin of FIG. 5 requires a different crankshaft and crankcase than that of FIG. 4. However, the crankcase of FIG. 5 can be used in a single cylinder embodiment as long as one of the cylinder openings is blocked off and a crankshaft with a rod journal appropriate for one connecting rod is used with balancing appropriate for a single cylinder. This embodiment is particularly suited for use in a snowmobile.

Figure 6:
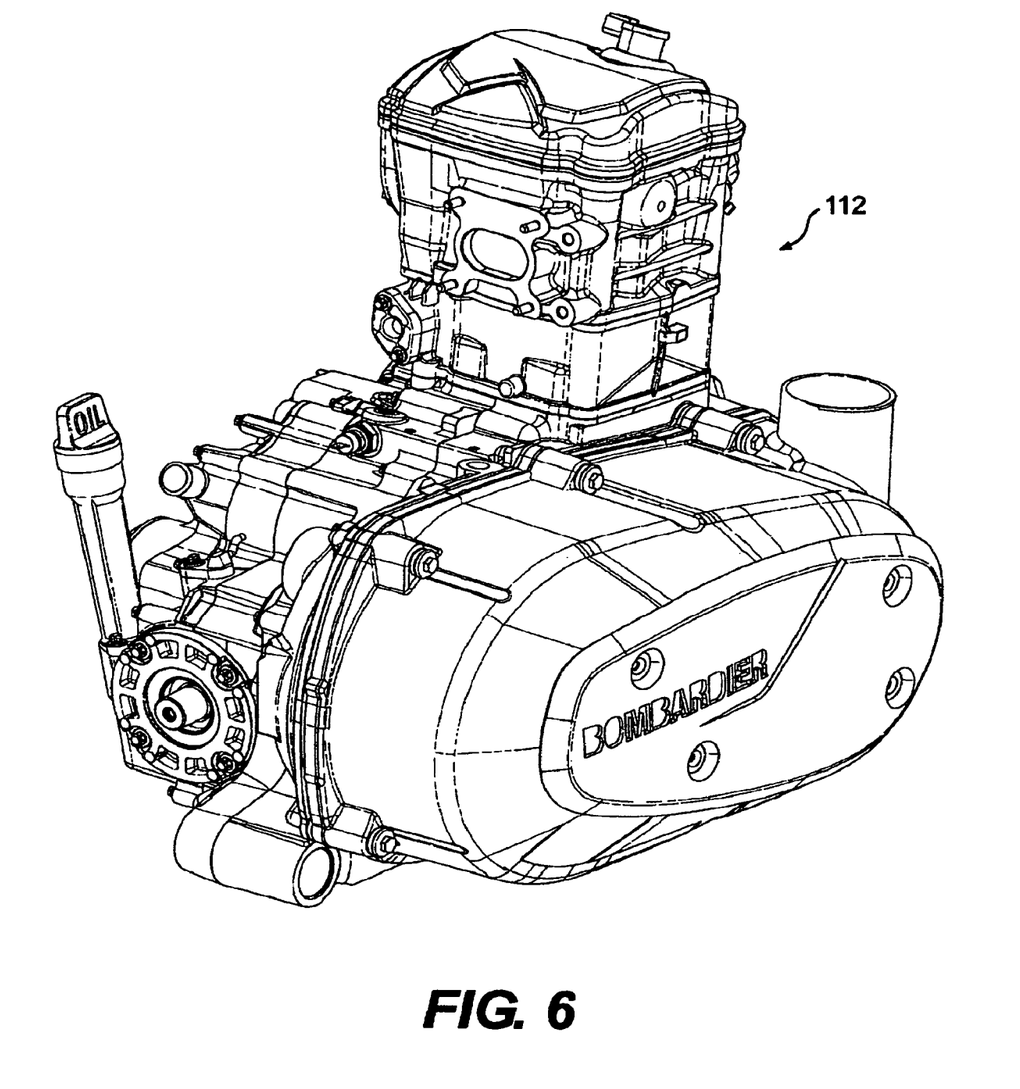
FIG. 6 is a perspective view of a second embodiment of a single cylinder engine using the cylinder component package of the present invention.

FIG. 6 shows a general schematic of a second embodiment of a single cylinder engine 112 according to the present invention. In particular, this engine configuration provides for a displacement of about 610 cc's. The details of this engine are described in several of the applications incorporated herein by reference, as indicated above.

Figure 7:
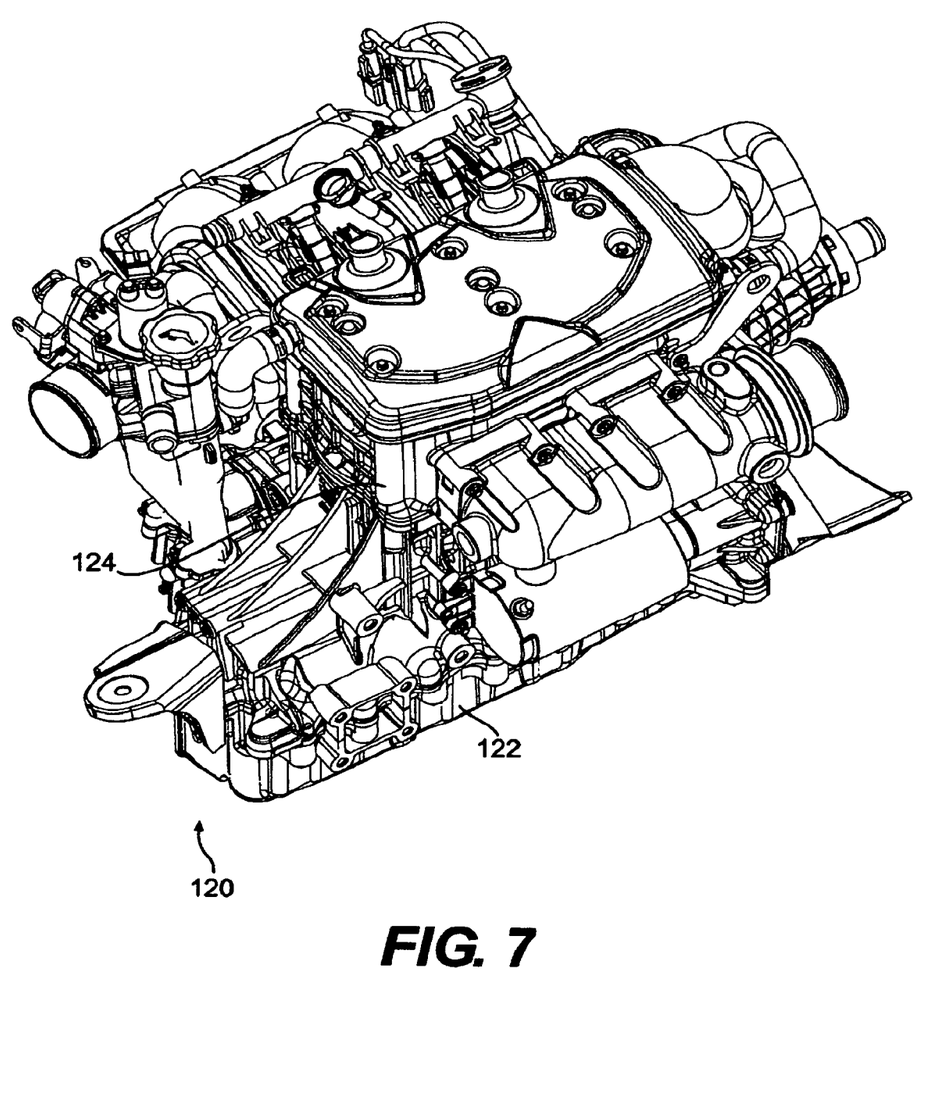
FIG. 7 is a perspective view of an inline two cylinder engine using two of the cylinder component packages of the present invention.

FIG. 7 shows a general schematic view of an inline twin engine 120 according to the present invention. Here, the same top end package as used in the single cylinder engine 100 is used in both cylinders of the inline twin. However, a single cylinder block 122 and cylinder head 124 is used.

Figure 8:
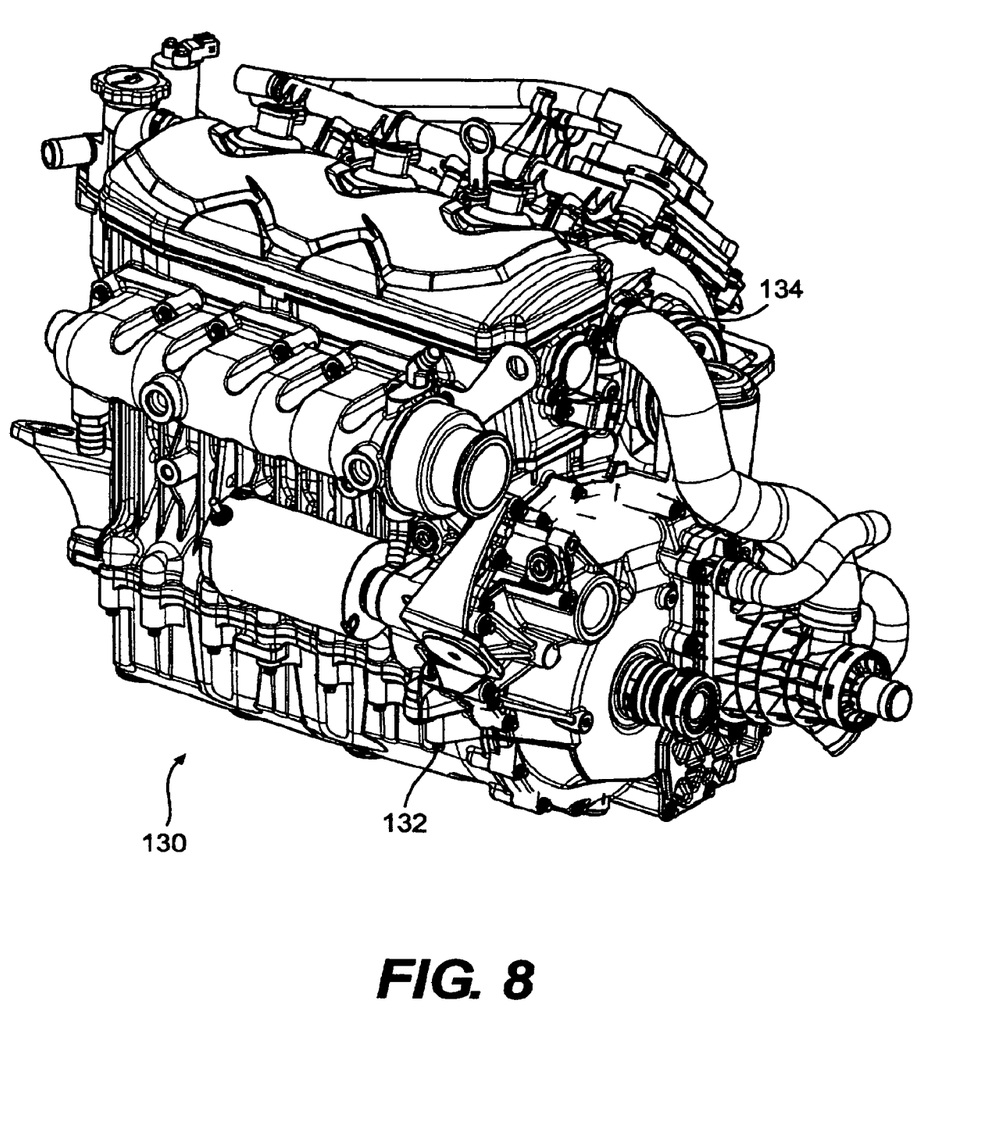
FIG. 8 is a perspective view of the inline three cylinder engine of FIG. 2.

FIG. 8 shows a general schematic view of an inline three engine 130 according to the present invention. Here, the same top end package as used in the single cylinder engine 100 is used in all three cylinders. However, as with the inline twin of FIG. 6, a single cylinder block 132 and cylinder head 134 is used. This embodiment is normally aspirated.

Figure 9:
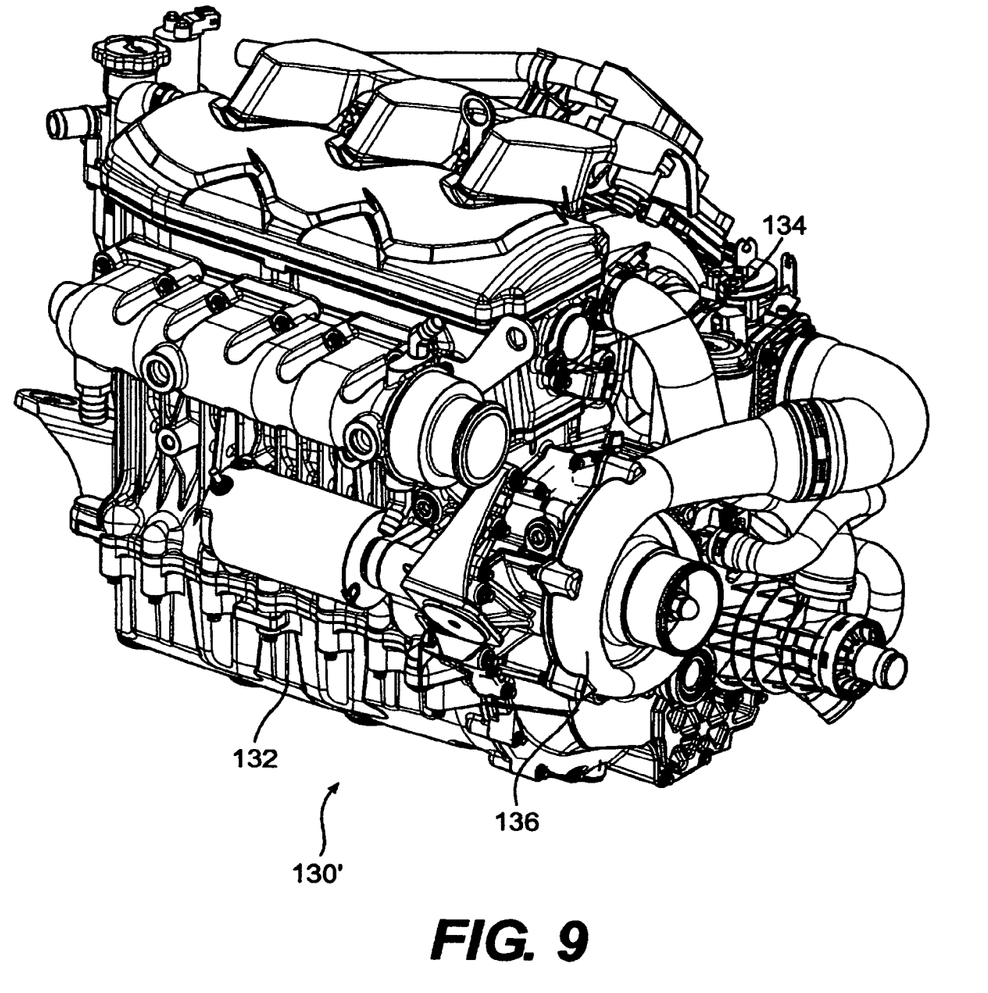
FIG. 9 is a perspective view of a supercharged version of the inline three cylinder engine of FIG. 8.

FIG. 9 shows the engine of FIG. 8 but in a supercharger embodiment using a positively driven blower. The supercharger for engine 130' is designated as 135. This embodiment is particularly suited for use in a watercraft.

Figure 10:
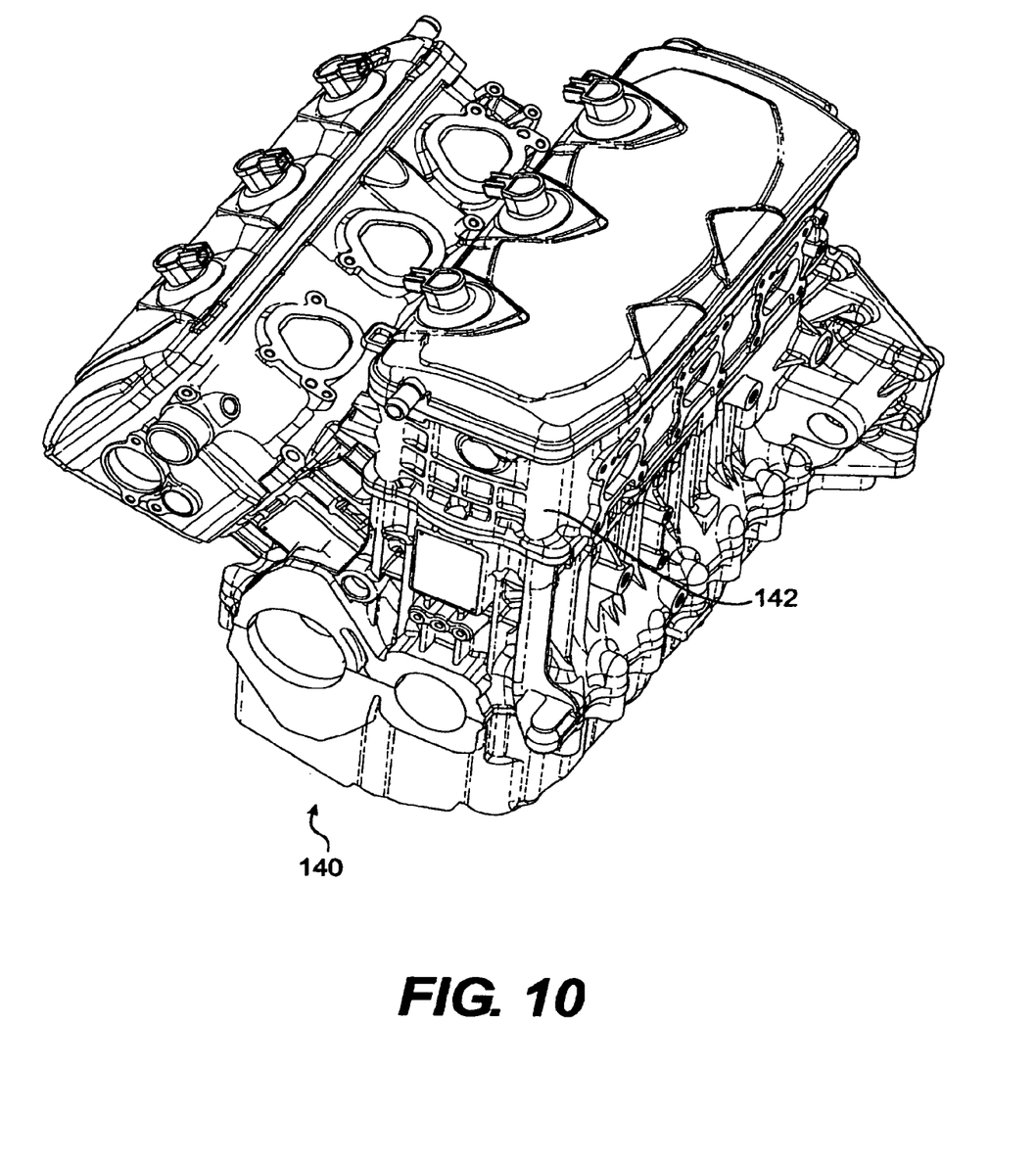
FIG. 10 is a perspective view of a V-6 engine using six of the cylinder component packages of the present invention.

FIG. 10 shows a general schematic view of a V-6 engine 140 according to the present invention. Here, the same top end package as used in the single cylinder engine 100 is used in all six cylinders. Further, the same cylinder head as used in the inline three engine of FIG. 8 is used on both banks of the V but rotated, as with the V-twin of FIG. 5. A different, unitary cylinder block 142 is used, as is a different crankshaft, as compared to the inline three.

Figure 11:
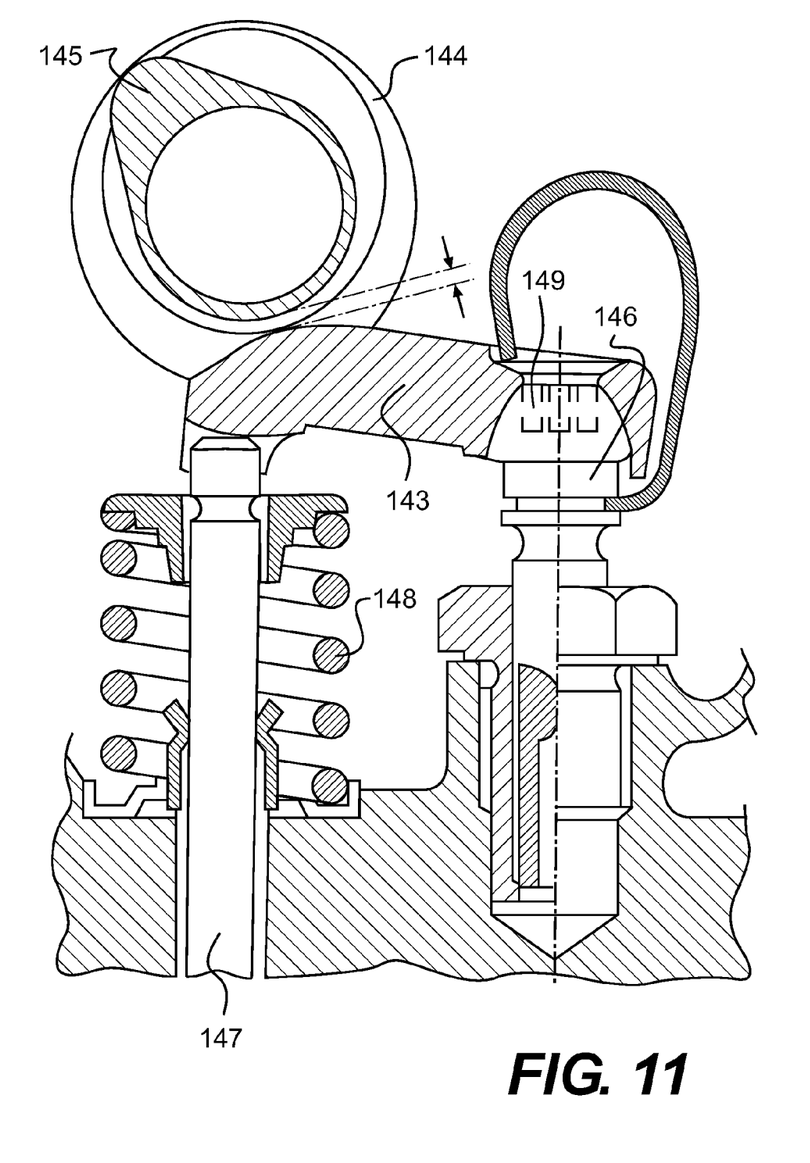
FIG. 11 is a schematic drawing of a cam follower valve assembly

FIG. 11 shows a general schematic drawing of a cam follower valve mechanism, the cam follower being designed as a cam lever 143. The cam lever 143 is pivoted on a bolt having a ball-shaped head 149. Instead of using a bolt or stud, according to a different embodiment the cam lever could also be pivotally mounted on a cam-lever shaft (not shown). Different to a rocker arm the cam lever as shown is pivotally mounted on one end and contacted by the cam on the other end. The motion applied by the cam to the lever is directly transmitted to the valve unit. The cam lever 143 is contacted by the cam 145 of a camshaft 146, whereby based on the profile of the rotating cam 145 and the retaining force of the valve spring 148 the valve stem 147 conducts a raising and lowering motion, thereby opening and closing the valve of the internal combustion engine.

Figure 12:
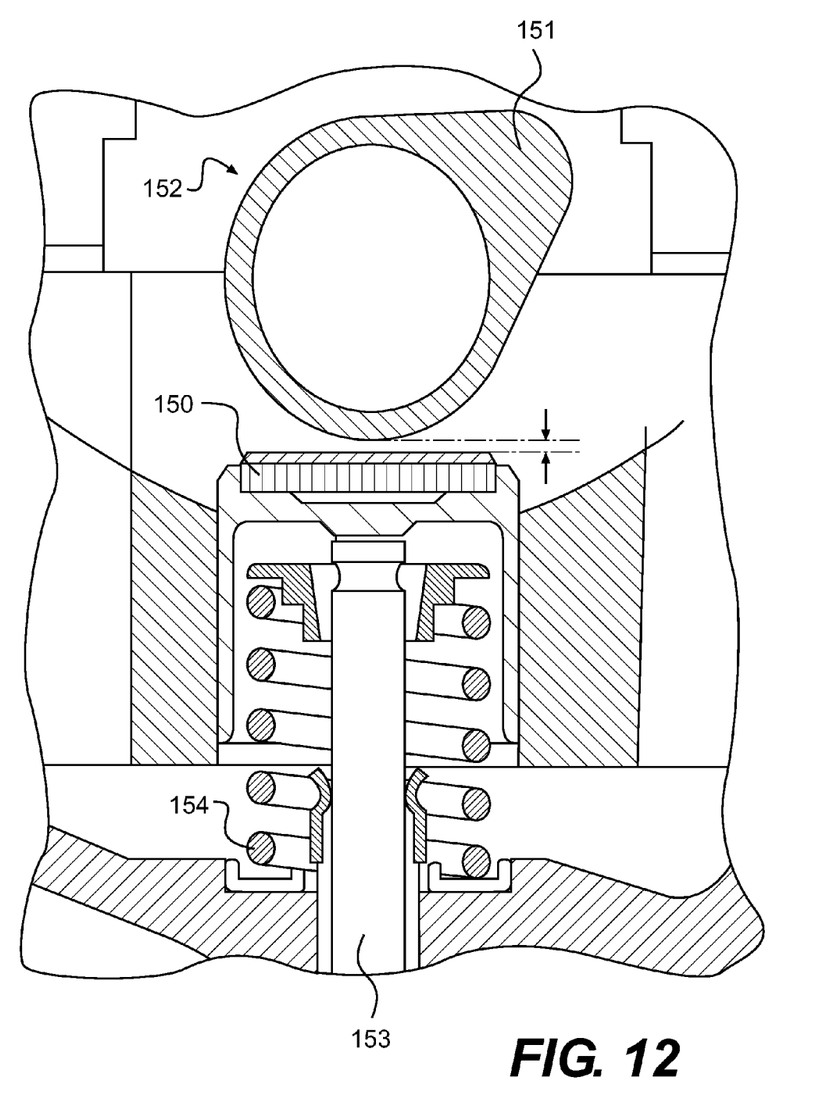
FIG. 12 is a schematic drawing of a bucket tappet valve assembly

FIG. 12 shows a general schematic drawing of a bucket tappet valve mechanism. A bucket tappet 150 is provided which is contacted by the cam 151 of the camshaft 152. According to the profile of the rotating cam in combination with the retaining force exerted by the spring 154 the valve stem 153 will executes a raising and lowering motion, thereby opening and closing the valve of the internal combustion engine the valve system is applied on. As a general rule valve assemblies on internal combustion engines comprise a valve, preferably a poppet valve in case of a 4-stroke internal combustion engine, a retracting element, preferably a spring or another resilient element, and a connecting element, preferably a cam follower, a finger rocker arm, a rocker lever or a bucket tappet, which connects the cam to the valve in order to transmit and transform the rotational movement of the cam to an, preferably oscillating, movement of the valve. Prevalently the valve assembly comprises an, preferably a mechanical and/or hydraulical, adjustment device for compensating and/or setting the valve play.

The description of several embodiments of the present invention above is meant to illustrate the breadth of the present invention and is not meant to limit the appended claims solely to the subject matter described. To the contrary, the broad scope of the present invention is apparent from the foregoing description.

What is claimed is:

1. A modular family of internal combustion engines, wherein:
   the family includes at least two engines of different type, each with a configuration selected from a group comprising single cylinder, V-type, inline, opposed, square, w-type and radial; and
   each of the at least two engines includes at least one cylinder, each cylinder of each engine of the family using identical top end component packages, and
   the at least two engines being each constructed and arranged to power a different recreational vehicle selected from a group comprising snowmobiles, all terrain vehicles, go carts, personal watercraft, boats with outboard motors, boats with inboard engines, motorcycles, scooters, and light aircrafts;
   a first engine of the at least two engines having a configuration of one of a single cylinder, V-type, W-type, opposed, and radial cylinder configuration;
   a second engine of the at least two engines having a configuration of one of an inline and a square cylinder configuration.

2. A modular family of internal combustion engines as in claim 1, wherein the engines are all overhead valve, four-stroke engines and the top end component package comprises:
   at least one exhaust valve, valve seat, valve guide, valve stem seal, valve spring, valve spring retainer; and
   at least one intake valve, valve seat, valve guide, valve stem seal, valve spring, valve spring retainer.

3. A modular family of internal combustion engines as in claim 1, wherein the top end component package comprises:
   a piston pin;
   a small end rod bearing;
   a big end rod bearing;
   a set of piston rings;
   a pair of connecting rod bolts;
   a cam chain tensioner;
   an exhaust valve tappet for each exhaust valve; and
   an intake valve tappet for each intake valve.

4. A modular family of internal combustion engines as in claim 1, wherein the top end component package comprises:

a piston; and a connecting rod.

5. A modular family of internal combustion engines as in claim 1, wherein the top end component package comprises at least one of a cylinder head and a camshaft.

6. A modular family of combustion engines as in claim 1, wherein the top end component package comprises at least one of:
- at least one rocker arm shaft;
- at least one valve lifter;
- at least one bucket tappet; and
- at least one cam follower.

7. A modular family of internal combustion engines as in claim 1, wherein the first engine has a cylinder configuration of one of a single cylinder and a V-twin, and wherein the second engine has a cylinder configuration of one of an inline twin and an inline three.

8. A modular family of internal combustion engines as in claim 1, wherein the first engine has a cylinder configuration of one of a V-six and a V-four and wherein the second engine has an inline four cylinder configuration.

9. A modular family of internal combustion engines as in claim 1, wherein the first engine has a cylinder configuration of one of a V-twin, a V-four and a V-six, and wherein the second engine has a cylinder configuration of one of an inline twin, an inline three and an inline four.

10. A modular family of internal combustion engines as in claim 1, wherein the at least two different engines comprise a third engine being different from the first and the second engine and having a configuration selected from a group comprising single cylinder, V-type, inline, opposed, square, w-type and radial.

11. The modular family of internal combustion engines as in claim 1, wherein the second engine includes at least two cylinders and a cylinder head, the cylinder head being shared by the at least two cylinders.

12. The modular family of internal combustion engines as in claim 1, wherein the second engine includes a first and a second cylinder, the first cylinder having a first valve and the second cylinder having a second valve, each of the first and the second valve being one of an intake and an exhaust valve, the second engine further including a camshaft, the camshaft being shared by the at least two cylinders.

13. An engine from a modular family of internal combustion engines, comprising:
- at least one cylinder; and
- a top end component package associated with the at least one cylinder;
- wherein the family includes at least two engines of different type, each with a configuration selected from a group comprising single cylinder, V-type, inline, opposed, square, w-type and radial;
- a first engine of the at least two engines having a configuration of one of a single cylinder, V-type, W-type, opposed and radial cylinder configuration;
- a second engine of the at least two engines having a configuration of one of an inline and a square cylinder configuration;
- wherein each cylinder of each engine of the family uses identical top end component packages; and
- wherein two of the at least two engines of different type are each constructed and arranged to power a different recreational vehicle selected from a group comprising snowmobiles, all terrain vehicles, go carts, personal watercrafts, boats with outboard motors, boats with inboard engines, motorcycles, scooters, and light aircrafts.

14. A method for manufacturing a modular family of internal combustion engines, comprising:
- designing a single top end component package; and
- designing a family of internal combustion engines, the family including at least two engines of different type, each with a configuration selected from a group comprising a single cylinder, V-type, inline, opposed, square, w-type and radial;
- designing a first engine of the at least two engines having a cylinder configuration of one of a single cylinder, V-type, W-type, opposed and radial engine;
- designing a second engine of the at least two engines having a cylinder configuration of one of an inline and a square engine;
- wherein each cylinder of each engine of the family uses the same top end component package designed in the first step; and
- wherein two of the at least two engines of different type are each constructed and arranged to power a different recreational vehicle selected from a group comprising snowmobiles, all terrain vehicles, go carts, personal watercrafts, boats with outboard motors, boats with inboard engines, motorcycles, scooters, and light aircrafts.

15. A method for reducing a number of unique components required for manufacturing a modular family of internal combustion engines, comprising:
- designing a single top end component package;
- designing a family of internal combustion engines, the family including at least two engines of different type, each with a configuration selected from a group comprising single cylinder, V-type, inline, opposed, square, w-type and radial;
- designing a first engine of the at least two engines having a cylinder configuration of one of a single cylinder, V-type, W-type, opposed, and radial engine;
- designing a second engine of the at least two engines having a cylinder configuration of one of an inline and a square engine;
- wherein, each cylinder of each engine of the family uses the same top end component package designed in the first step and each component in the top end component package is designed to comply with the strictest performance requirement for that component in any application utilizing one of the family of engines; and
- wherein two of the at least two engines, with different configurations, are each constructed and arranged to power a different recreational vehicle selected from a group comprising snowmobiles, all terrain vehicles, go carts, personal watercraft, boats with outboard motors, boats with inboard engines, motorcycles, scooters, and light aircraft.

* * * * *

UNITED STATES PATENT AND TRADEMARK OFFICE
CERTIFICATE OF CORRECTION

PATENT NO.       : 7,600,492 B2        Page 1 of 1
APPLICATION NO.  : 11/168504
DATED            : October 13, 2009
INVENTOR(S)      : Bilek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Fifth Day of October, 2010

David J. Kappos
*Director of the United States Patent and Trademark Office*